United States Patent
Usui (10) Patent No.: US 7,952,334 B2
(45) Date of Patent: May 31, 2011

(54) DC-DC CONVERTER

(75) Inventor: Hiroshi Usui, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 399 days.

(21) Appl. No.: 12/119,895

(22) Filed: May 13, 2008

(65) Prior Publication Data

US 2008/0284390 A1  Nov. 20, 2008

(30) Foreign Application Priority Data

May 14, 2007  (JP) .............................. P2007-127843

(51) Int. Cl.
   *G05F 1/00* (2006.01)
(52) U.S. Cl. ...................................... 323/271
(58) Field of Classification Search ............... 323/222, 323/235, 271, 272, 282
   See application file for complete search history.

(56) References Cited

U.S. PATENT DOCUMENTS

| | | | | |
|---|---|---|---|---|
| 5,267,137 A | * | 11/1993 | Goebel | 363/87 |
| 7,254,046 B2 | * | 8/2007 | Kawasaki et al. | 363/21.12 |
| 7,378,823 B2 | * | 5/2008 | Yamanaka et al. | 323/267 |
| 7,466,170 B2 | * | 12/2008 | Balakrishnan | 327/112 |
| 7,706,151 B2 | * | 4/2010 | Neidorff et al. | 363/9 |
| 2007/0268729 A1 | * | 11/2007 | Choi et al. | 363/132 |
| 2008/0284390 A1 | * | 11/2008 | Usui | 323/271 |

FOREIGN PATENT DOCUMENTS

JP  2006-121840  5/2006
WO  WO 2006/043391 A1  4/2006

OTHER PUBLICATIONS

U.S. Appl. No. 12/781,238, filed May 17, 2010, Usui.
U.S. Appl. No. 12/824,590, filed Jun. 28, 2010, Usui.

* cited by examiner

*Primary Examiner* — Adolf Berhane
*Assistant Examiner* — Yemane Mehari
(74) *Attorney, Agent, or Firm* — Oblon, Spivak, McClelland, Maier & Neustadt, L.L.P.

(57) ABSTRACT

A DC-DC converter includes a series circuit of a switch element Q1 and a switch element Q2 connected to a DC power source, a series circuit of a primary winding P1 of a transformer and a capacitor connected in parallel with one of the switch elements, a rectifying-smoothing circuit of a voltage generated by a secondary winding (S1, S2) of the transformer, a controller to alternately turn on/off the switch elements according to an output of the rectifying-smoothing circuit, first and second timing detectors to detect ON/OFF states of the switch elements, and an ON time storing part to operate in response to a detection signal from the second timing detector and store an ON time of the switch element Q1 based on an OFF time of the switch element Q2. The controller turns on the switch element Q2 only during the stored ON time.

10 Claims, 7 Drawing Sheets

FIG. 1

Related Art

FIG. 2

Related Art

DC-DC CONVERTER

BACKGROUND OF THE INVENTION

1. Field of the Invention

The present invention relates to a DC-DC converter that is highly efficient, small, and inexpensive.

2. Description of the Related Art

Figure 1:
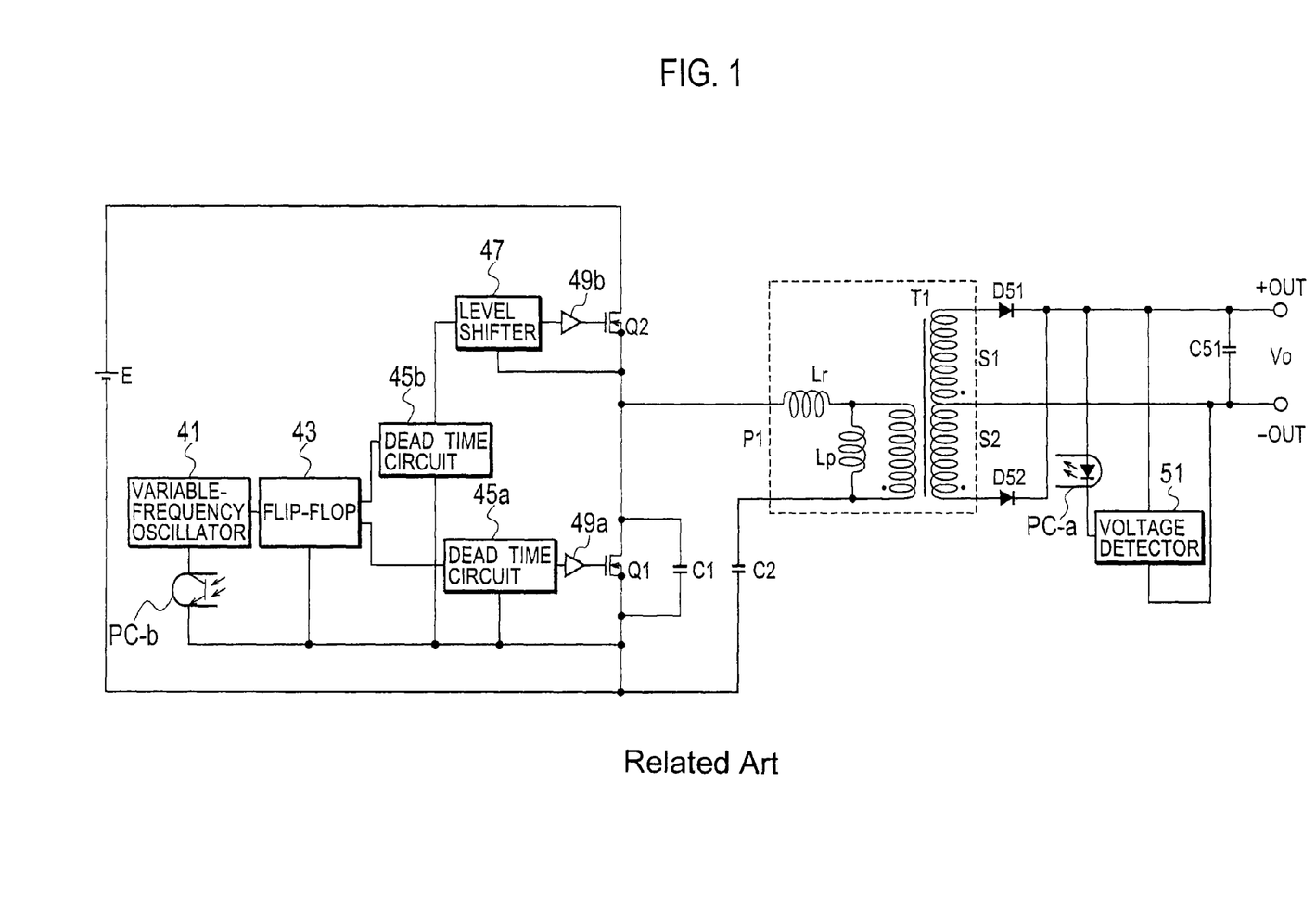
FIG. 1 is a view illustrating a DC-DC converter according to a related art.

FIG. 1 shows a DC-DC converter according to a related art. In FIG. 1, a DC power source E has two ends connected to a series circuit consisting of switch elements Q1 and Q2. The switch elements Q1 and Q2 are, for example, MOSFETs. Between drain and source of the switch element Q1, a series circuit consisting of a primary winding P1 of a transformer T1 and a current resonant capacitor C2 is connected in parallel with the switch element Q1. The primary winding P1 involves an exciting inductance Lp and a leakage inductance Lr. In parallel with the switch element Q1, there is connected a voltage resonant capacitor C1.

Secondary windings S1 and S2 of the transformer T1 are connected in series with each other. The secondary windings S1 and S2 are connected to anodes of diodes D51 and D52, respectively, in opposite polarities. Cathodes of the diodes D51 and D52 are connected to each other and through a positive pole of a smoothing capacitor C51 to an output terminal +OUT. A connection point of the secondary windings S1 and S2 is connected through a negative pole of the smoothing capacitor C51 to an output terminal –OUT.

Between the output terminals +OUT and –OUT, there is connected a voltage detector 51. An output terminal of the voltage detector 51 is connected through a light emitting diode PC-a of a photocoupler to the output terminal +OUT. A phototransistor PC-b of the photocoupler is connected to an input terminal of a variable-frequency oscillator 41 as a voltage controlled oscillator that changes an oscillation frequency according to a voltage detected by the voltage detector 51.

An output terminal of the variable-frequency oscillator 41 is connected to a clock terminal of a flip-flop 43. The flip-flop 43 has exclusive two outputs that are connected to dead time circuits 45a and 45b, respectively.

An output of the dead time circuit 45a is connected through a driver 49a or a buffer to a gate terminal of the switch element Q1. An output of the dead time circuit 45b is connected to a level shifter 47. The level shifter 47 is connected through a driver 49b or a buffer to a gate terminal of the switch element Q2.

Figure 2:
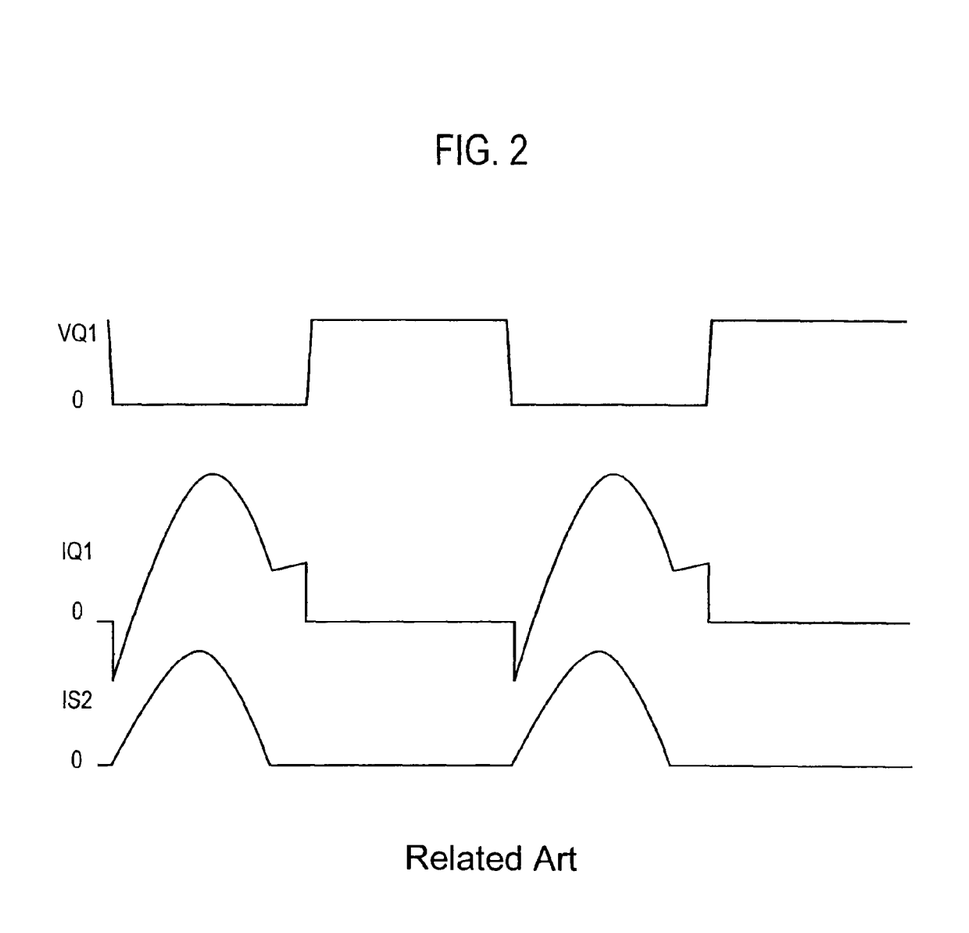
FIG. 2 is a waveform diagram illustrating waveforms created at parts of the DC-DC converter according to the related art.

Operation of the DC-DC converter according to the related art having the above-mentioned configuration will be explained with reference to FIGS. 1 and 2.

The variable-frequency oscillator 41 sends a clock signal to the flip-flop 43, which outputs exclusive two signals each having a duty of 50%. One of the output signals is supplied to the dead time circuit 45a, which adds a dead time to the signal. The dead time added signal is passed through the driver 49a to become a drive signal for the switch element Q1.

The other output signal from the flip-flop 43 is supplied to the dead time circuit 45b, which adds a dead time to the signal. The dead time added signal is sent to the level shifter 47 which changes the voltage of the signal to a higher level. The high-voltage signal is passed through the driver 49b to become a drive signal for the switch element Q2. In response to the drive signals, the switch elements Q1 and Q2 alternately turns on/off interrupted by each dead time.

When the switch element Q2 turns on, a current passes through a path extending along E, Q2, P1, C2, and E. At this time, a voltage applied to the primary winding P1 of the transformer T1 causes the secondary winding S1 to generate a voltage in proportion to a turn ratio. This results in passing a current through a path extending along S1, D51, C51, and S1. At the same time, a load current passes through the smoothing capacitor C51 and output terminals +OUT and –OUT to a load (not illustrated). The load current equivalently passes through a series resonant circuit of the leakage inductance Lr, smoothing capacitor C51, and current resonant capacitor C2, to form a resonant current. A capacitance relationship of the capacitors C51 and C2 can be described such as C51>>C2, and therefore, the resonant current is substantially determined by the leakage inductance Lr and current resonant capacitor C2.

The exciting inductance Lp of the primary winding P1 passes a triangular exciting current to accumulate energy in the transformer T1. As a result, the primary winding P1 passes a current that is a superimposition of the resonant current and exciting current.

When the switch element Q2 turns off, the energy in the transformer T1 accumulated by the exciting inductance Lp is released through a path extending along Lp, C2, C1, Lr, and Lp. Assuming relationships of Lp>>Lr and C2>>C1, and therefore, a resonant current at this time is substantially determined by the exciting inductance Lp and voltage resonant capacitor C1 and a voltage quasi-resonant waveform appears at the voltage resonant capacitor C1 accordingly. Based on the quasi-resonant frequency, the dead time circuit 45a sets a dead time. The voltage of the voltage resonant capacitor C1 serves as a switching voltage of the switch elements Q1 and Q2, so that the switch element Q1 realizes a zero-volt switching operation. Once the set dead time elapses, the switch element Q1 is turned on.

When the switch element Q1 turns on, the electromotive force of the current resonant capacitor C2 passes a current IQ1 through a path extending along C2, P1, Q1, and C2. At this time, a voltage applied to the primary winding P1 causes the secondary winding S2 to generate a voltage in proportion to a turn ratio. The electromotive force of the secondary winding S2 passes a current IS2 through a path extending along S2, D52, C51, and S2. At the same time, a load current passes through the smoothing capacitor C51 and output terminals +OUT and –OUT to the load (not illustrated). The load current equivalently passes through the series resonant circuit of the leakage inductance Lr, smoothing capacitor C51, and current resonant capacitor C2, to form a resonant current. The capacitors C51 and C2 have a capacitance relationship of C51>>C2, and therefore, the resonant current is substantially determined by the leakage inductance Lr and current resonant capacitor C2.

The exciting inductance Lp of the primary winding P1 passes a triangular exciting current to accumulate energy in the transformer T1. As a result, the primary winding P1 passes a current that is a superimposition of the resonant current and exciting current.

When the switch element Q1 turns off, the energy in the transformer T1 accumulated by the exciting inductance Lp is released through a path extending along Lp, Lr, C1, C2, and Lp. There are relationships of Lp>>Lr and C2>>C1, and therefore, a resonant current at this time is substantially determined by the exciting inductance Lp and voltage resonant capacitor C1 and a voltage quasi-resonant waveform appears at the voltage resonant capacitor C1 accordingly. Based on the quasi-resonant frequency, the dead time circuit 45b sets a dead time. The voltage of the voltage resonant capacitor C1 serves as a switching voltage of the switch elements Q1 and Q2, so that the switch element Q2 realizes a zero-volt switching operation. Once the set dead time elapses, the switch element Q2 is again turned on. Thereafter, the above-mentioned actions are repeated.

The voltage detector 51 detects an output voltage appearing at the output terminals +OUT and −OUT, generates an error voltage signal according to a difference between the output voltage and a reference voltage, and outputs the error voltage signal from the diode PC-a of the photocoupler. The diode PC-a of the photocoupler transmits in an insulated state the error voltage signal to the primary side. Receiving the error voltage signal, the transistor PC-b of the photocoupler variably controls the oscillation frequency of the variable frequency oscillator 41. Variably controlling the oscillation frequency of the oscillator 41 results in controlling the output voltage. Namely, increasing the oscillation frequency results in decreasing the output voltage and decreasing the oscillation frequency results in increasing the output voltage.

SUMMARY OF THE INVENTION

The DC-DC converter of the related art illustrated in FIG. 1 should synchronize the switch elements Q1 and Q2 with each other when controlling them. The switch elements Q1 and Q2 have greatly different potential levels, and therefore, the related art should employ some insulating means or the level shifter 47 illustrated in FIG. 1. The large potential difference of the switch elements Q1 and Q2 requires the level shifter 47 to have a capacity of 600 V or over in the case of a 200-volt-based commercial power source.

Because of such a large potential difference, the level shifter 47 generates a control signal from a pulse current. If a switching frequency is high, the pulse current should increase the number of times of switching accordingly. This increases a loss. Due to this, the related art is unable to achieve a high-frequency operation and reduce the size thereof and the high-side driver of the related art should employ expensive elements.

The insulating means that should be employed by the related art may be a pulse transformer. The pulse transformer, however, is large and is hardly integrated into an IC, to thereby hinder compactness.

According to the present invention, an inexpensive small DC-DC converter capable of operating at high frequencies without expensive high-side drivers can be provided.

According to a first aspect of the present invention, provided is A DC-DC converter including a first series circuit including a first switch element and a second switch element and connected to ends of a DC power source; a second series circuit including a primary winding of a transformer and a capacitor and connected in parallel with one of the first switch element and the second switch element; a rectifying-smoothing circuit configured to rectify and smooth a voltage generated by a secondary winding of the transformer; a controller configured to alternately turn on/off the first and second switch elements according to an output voltage from the rectifying-smoothing circuit; a first timing detector configured to detect ON/OFF states of the first and second switch elements; a second timing detector configured to detect ON/OFF states of the first and second switch elements; and an ON time storing part configured to operate in response to a detection signal from the second timing detector and store an ON time of the first switch element based on an OFF time of the second switch element, wherein the controller turns on the second switch element only for the ON time stored in the ON time storing part.

According to a second aspect of the present invention, the ON time storing part substantially equalizes the ON time of the first switch element and the ON time of the second switch element with each other.

According to a third aspect of the present invention, the first timing detector detects turning off of the second switch element as a terminal voltage of the first switch element reaches a first threshold; and the second timing detector detects turning off of the first switch element as a terminal voltage of the second switch element reaches a second threshold.

According to a fourth aspect of the present invention, the first and second thresholds each are approximately zero volts.

According to a fifth aspect of the present invention that is based on the first and second aspects, the transformer includes a second primary winding and a third primary winding, wherein the first timing detector detects turning off of the second switch element as a voltage of the second primary winding reaches a first threshold and wherein the second timing detector detects turning off of the first switch element when a voltage of the third primary winding reaches a second threshold.

According to a sixth aspect of the present invention that is based on the fifth aspect, the first and second thresholds each are approximately zero volts.

According to a seventh aspect of the present invention that is based on the first and second aspects, the transformer includes a second primary winding and a third primary winding, wherein the first timing detector detects a voltage change and polarity of the second primary winding, and as the voltage change of the second primary winding crosses a first threshold range, determines that the second switch element has turned off and wherein the second timing detector detects a voltage change and polarity of the third primary winding, and as the voltage change of the third primary winding crosses a second threshold range, determines that the first switch element has turned off.

According to an eighth aspect of the present invention that is based on the first aspect, the ON time storing part turns on the second switch element only during an estimated period according to a difference between the stored ON time and a period during which the first and second switch elements are both OFF.

According to a ninth aspect of the present invention, the controller delays the timing of turning on the first switch element and the timing of turning on the second switch element by a predetermined time.

DESCRIPTION OF THE PREFERRED EMBODIMENT

DC-DC converters according to embodiments of the present invention will be explained in detail with reference to the drawings.

First Embodiment

Figure 3:
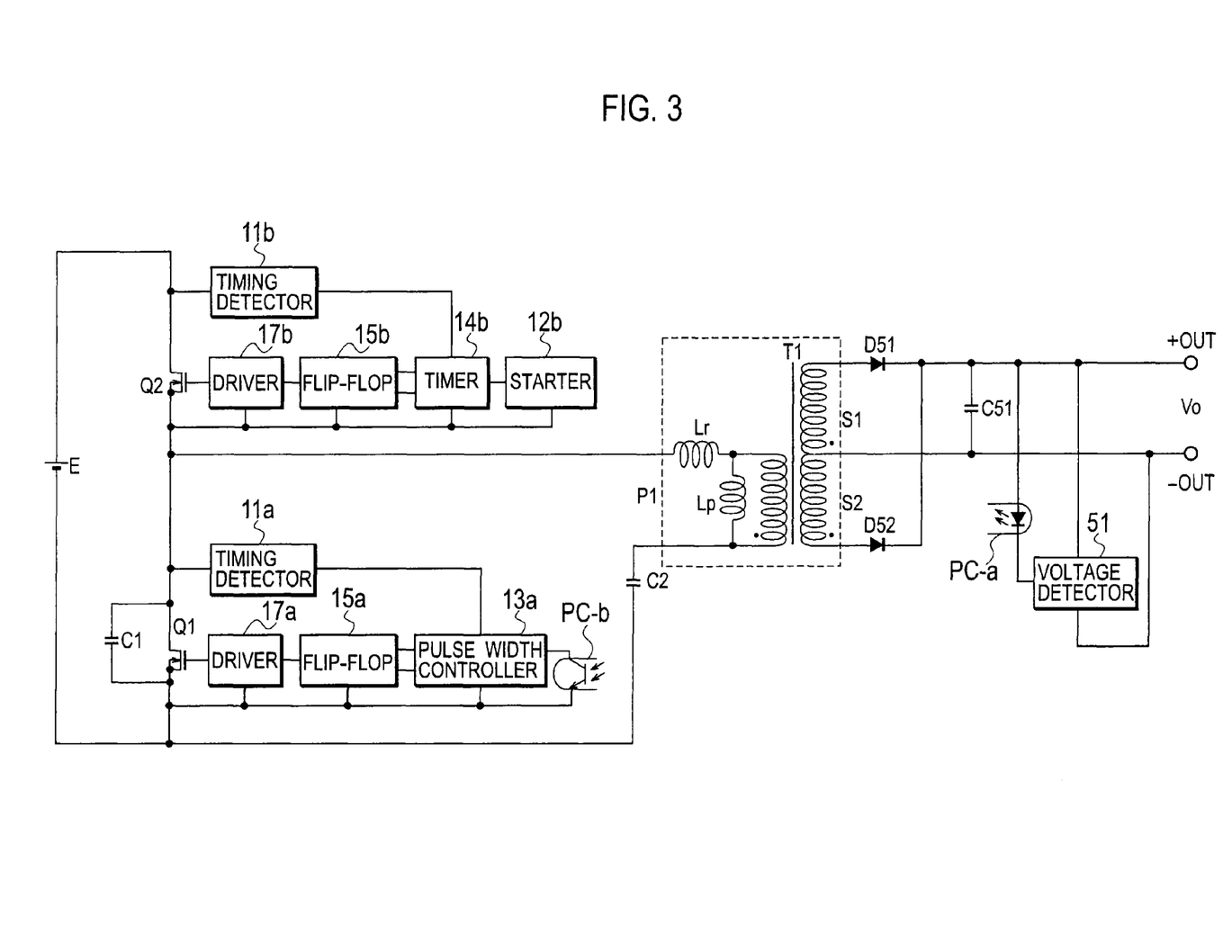
FIG. 3 is a view illustrating a DC-DC converter according to a first embodiment of the present invention.

FIG. 3 is a view illustrating a DC-DC converter according to the first embodiment of the present invention. In FIG. 3, the same parts as those of the DC-DC converter of the related art illustrated in FIG. 1 are depicted by the same reference marks and are not explained again. Parts differing from those of the related art will be explained.

A switch element Q2 is a second switch element. A drain of the switch element Q2 is connected to an input terminal of a timing detector 11b. A source of the switch element Q2 is commonly connected to ends of a starter 12b, timer 14b, flip-flop 15b, and driver 17b.

The starter 12b sets a predetermined time in the timer 14b. At the predetermined time set by the starter 12b, the timer 14b sets the flip-flop 15b which may be an RS flip-flop. When set by the timer 14b, the flip-flop 15b outputs a high-level signal to the driver 17b. In response to the high-level signal from the flip-flop 15b, the driver 17b turns on the switch element Q2 only for a preset time, and when the preset time elapses, turns off the switch element Q2.

The timing detector 11b is a second timing detector. If a terminal voltage of the switch element Q2 exceeds a second threshold Vth2 (for example, about zero volts), the timing detector 11b detects that a switch element Q1 (first switch element) has turned on and outputs a detection signal to the timer 14b. In response to the detection signal from the timing detector 11b, the timer 14b (ON time storing part) turns on to start counting and store an ON time of the switch element Q1. The driver 17b (controller) turns on the switch element Q2 only for the ON time that has been stored in the timer 14b in response to the detection signal from the timing detector 11b.

A drain of the switch element Q1 is connected to an input terminal of a timing detector 11a. A source of the switch element Q1 is commonly connected to ends of a pulse width controller 13a, flip-flop 15a, and driver 17a.

The timing detector 11a is a first timing detector. If a terminal voltage of the switch element Q1 reaches a first threshold Vth1 (for example, about zero volts), the timing detector 11a detects that the switch element Q2 has turned off and outputs a detection signal to the pulse width controller 13a (controller). In response to the detection signal, the pulse width controller 13a sets the flip-flop 15a, which provides the driver 17a with the output signal of the pulse width controller 13a. In response to the output of the flip-flop 15a, the driver 17a (controller) drives the switch element Q1.

Figure 4:
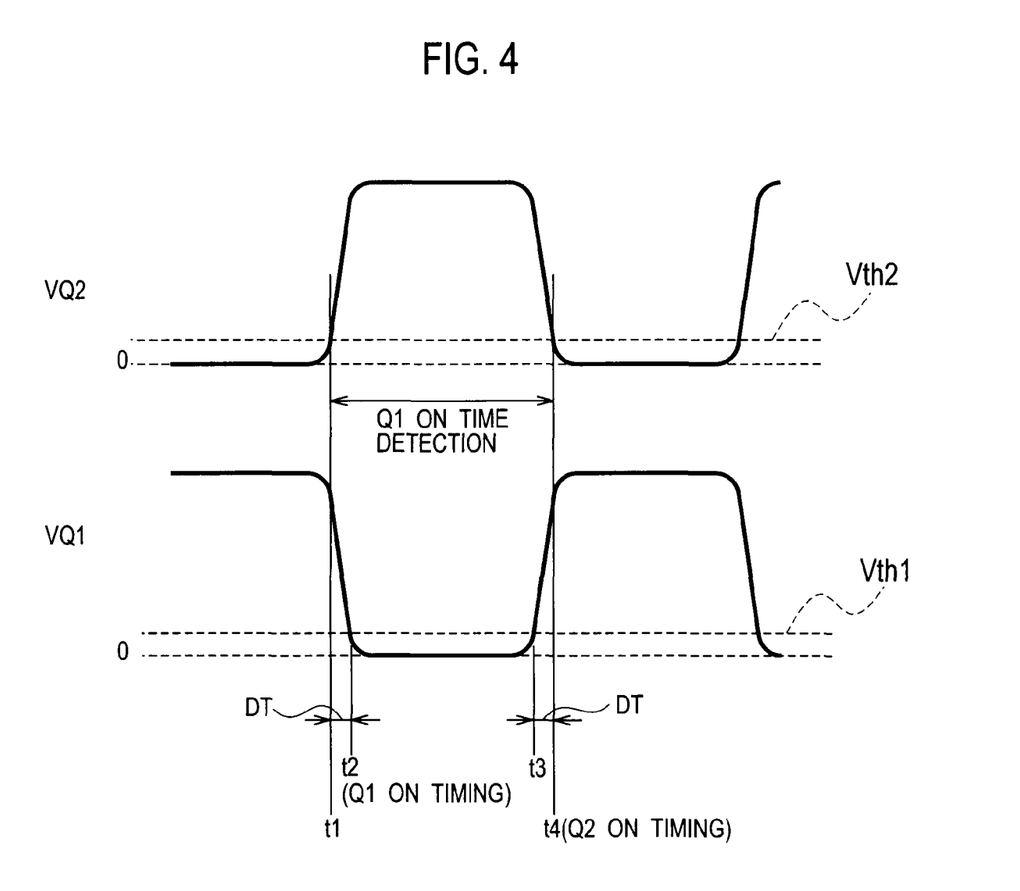
FIG. 4 is a view illustrating the detection timing of a timing detector arranged in the DC-DC converter of the first embodiment.

Operation of the DC-DC converter according to the first embodiment having the above-mentioned configuration will be explained with reference to detection timing waveforms as illustrated in FIG. 4.

The starter 12b sets predetermined time in the timer 14b. At the predetermined time, the timer 14b sets the flip-flop 15b. The flip-flop 15b provides a high-level output and the driver 17b provides a high-level output to turn on the switch element Q2. The switch element Q2 is turned off when a predetermined time elapses.

At a time point t1, the switch element Q2 is turned off. Namely, a voltage VQ2 of the switch element Q2 reaches the threshold Vth2 that is about zero volts. Then, a voltage VQ1 of the switch element Q1 to which a power source voltage E has been applied gradually decreases due to a voltage quasi-resonant operation.

At a time point t2, the timing detector 11a detects that the voltage of the switch element Q1 has reached the threshold Vth1 that is about zero volts and provides a detection signal to turn on the pulse width controller 13a.

When turned on, the pulse width controller 13a sets the flip-flop 15a, which then provides a high-level output. As a result, the driver 17a provides a high-level output to turn on the switch element Q1 at the time point t2.

The pulse width controller 13a varies an internal time constant according to a feedback signal provided by a transistor PC-b of a photocoupler and determines a time period between setting the flip-flop 15a and resetting the same. Namely, according to the feedback signal, the pulse width controller 13a provides the flip-flop 15a with a reset signal. When being reset, the flip-flop 15a provides a low-level output. As a result, the driver 17a provides a low-level output to turn off the switch element Q1.

At a time point t3, the voltage of the switch element Q1 reaches the threshold Vth1, i.e., the switch element Q1 is turned off. Then, the voltage of the switch element Q2 to which the power source voltage E has been applied gradually decreases due to a voltage quasi-resonant operation.

At a time point t4, the timing detector 11b detects that the voltage of the switch element Q2 has reached the threshold Vth2 that is approximately zero volts and provides a detection signal. The detection signal turns on the timer 14b. When turned on, the timer 14b sets the flip-flop 15b, which outputs a high-level output. As a result, the driver 17b provides a high-level signal to turn on the switch element Q2 at the time point t4.

During the time (from t2 to t3) when the switch element Q1 is ON, ends of the switch element Q2 receive the power source voltage E. A period in which a voltage is applied to the ends of the switch element Q2 is the sum of the ON time of the switch element Q1 and a dead time (the sum of an ON dead time DT and an OFF dead time DT).

Accordingly, by detecting the timing (t1, t4) when the terminal voltage of the switch element Q2 reaches the threshold Vth2, the timing detector 11b can detect the ON time of the switch element Q1. The dead time DT is determined by an exciting inductance Lp of a primary winding P1 of a transformer T1 and a current resonant capacitor C1 and is substantially constant.

The timer 14b stores the output from the timing detector 14b, subtracts the constant dead time DT from the output to find a difference that represents the ON time of the switch element Q1, and copies the difference.

When the copied ON time of the switch element Q1 elapses, the timer 14b resets the flip-flop 15b, to turn on the switch element Q2 through the driver 17b for a time equal to the ON time of the switch element Q1. In this way, the timer 14b substantially equalizes the ON time of the switch element Q1 and the ON time of the switch element Q2 with each other.

These actions are repeated. In other words, the switch elements Q1 and Q2 are alternately turned on/off under the control of the pulse width controller 13a with a substantially fixed dead time interposed. The ON time of the switch element Q1 and that of the switch element Q2 are always equalized with each other. The ON time of each of the switch elements Q1 and Q2 is adjusted according to an output voltage error signal. Namely, the DC-DC converter according to the first embodiment operates like the DC-DC converter according to the related art.

In this way, the DC-DC converter according to the first embodiment can drive switch elements of different potentials with little loss without employing expensive high-side drivers. The DC-DC converter of the first embodiment is suitable for high-frequency operation and is easy to integrate into an IC. When designed to operate at high frequencies, the DC-DC converter of the first embodiment only needs a small transformer, to reduce the cost thereof.

Second Embodiment

Figure 5:
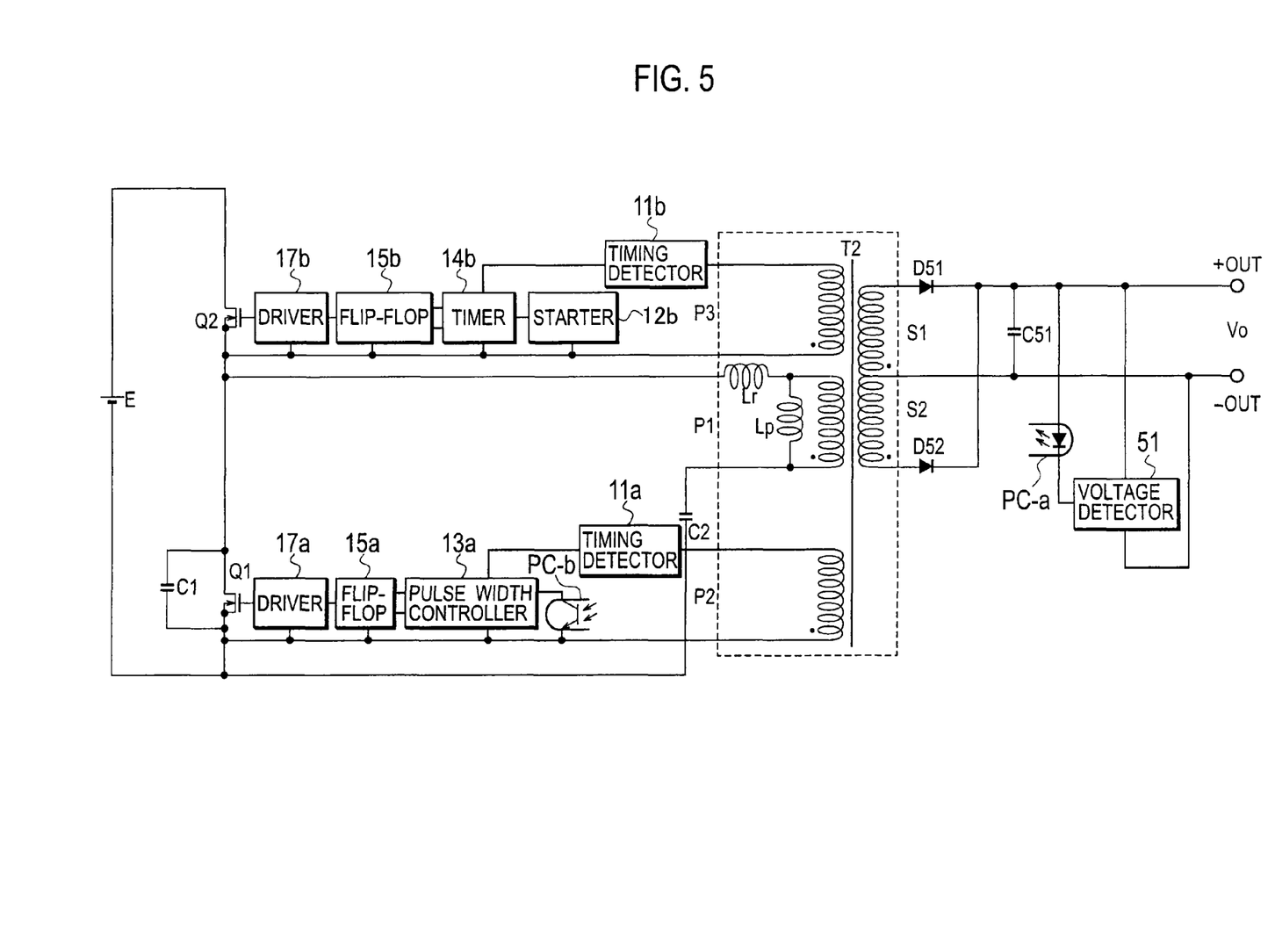
FIG. 5 is a view illustrating a DC-DC converter according to a second embodiment of the present invention.

FIG. 5 is a view illustrating a DC-DC converter according to the second embodiment of the present invention. The DC-DC converter of the second embodiment illustrated in FIG. 5 employs a transformer T2 having a second primary winding P2 and a third primary winding P3 in addition to the transformer T1 of the DC-DC converter according to the first embodiment illustrated in FIG. 3.

When the voltage of the third primary winding P3 of the transformer T2 exceeds a fourth threshold Vth4, which is approximately zero volts, a timing detector 11*b* detects that a switch element Q1 has turned off and outputs a detection signal to a timer 14*b*.

When the voltage of the second primary winding P2 of the transformer T2 reaches a third threshold Vth3, which is approximately zero volts, a timing detector 11*a* detects that a switch element Q2 has turned off and outputs a detection signal to a pulse width controller 13*a*.

The remaining configuration of the second embodiment illustrated in FIG. 5 is the same as that of the first embodiment illustrated in FIG. 3, and therefore, the same parts are represented with the same reference marks to omit their explanations.

Figure 6:
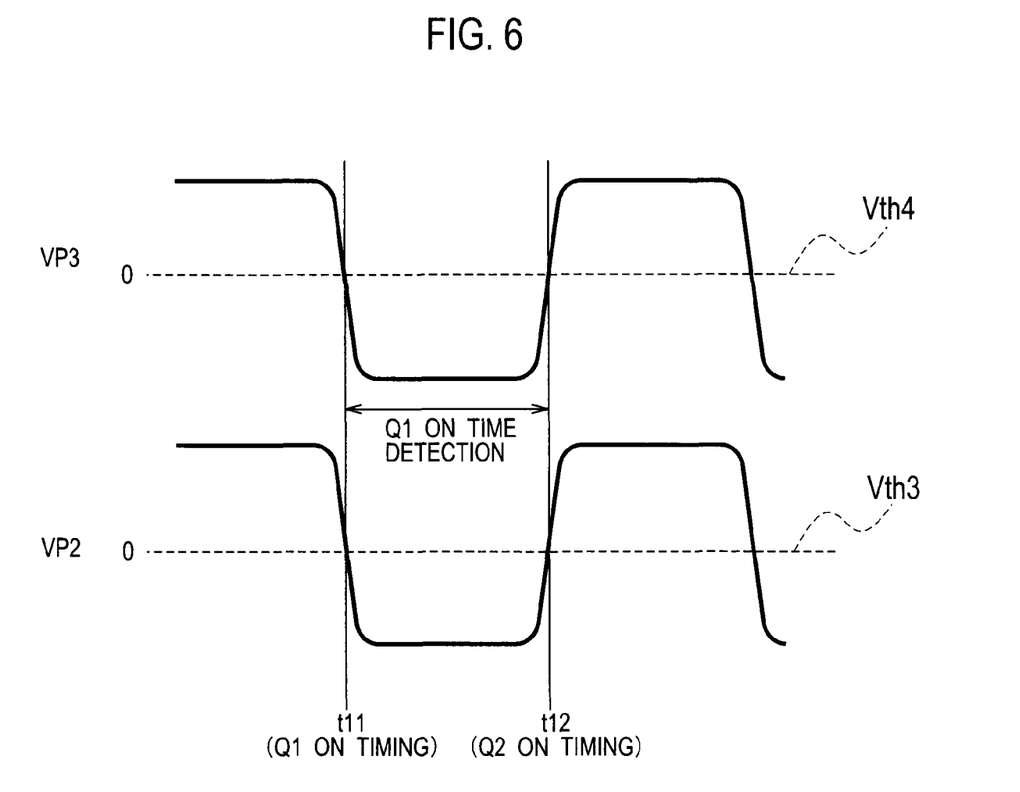
FIG. 6 is a view illustrating the detection timing of a timing detector arranged in the DC-DC converter of the second embodiment.

FIG. 6 is a view illustrating the detection timing of the timing detectors arranged in the DC-DC converter according to the second embodiment of the present invention. In FIG. 6, VP3 is the voltage of the third primary winding P3 of the transformer T2 and VP2 is the voltage of the second primary winding P2 of the transformer T2.

As illustrated in FIG. 6, the timing detector 11*a* can detect that the switch element Q2 has turned off at the center of a dead time period DT, i.e., when the voltage VP2 of the second primary winding P2 of the transformer T2 reaches zero volts (time point t11). The timing detector 11*b* can detect that the switch element Q1 has turned off at the center of a dead time period DT, i.e., when the voltage VP3 of the third primary winding P3 of the transformer T2 exceeds zero volts (time point t12).

At the detection timing, the pulse width controller 13*a* sets a predetermined delay time adapted to a voltage quasi-resonant period that is beforehand known. Namely, the pulse width controller 13*a* delays the ON time of the switch element Q1 by the predetermined delay time when controlling the switch element Q1. The timer 14*b* delays the ON time of the switch element Q2 by a predetermined time when controlling the switch element Q2. This realizes optimum resonant switching.

The optimum resonant switching means realizing zero-volt switching (ZVS) that turns on the switch elements Q1 and Q2 after the terminal voltages of the switch elements Q1 and Q2 become nearly zero.

According to the DC-DC converter of the second embodiment, a period during which a voltage is applied to the switch element Q2 is the sum of an ON time of the switch element Q1 and a quotient obtained by dividing the total of an ON dead time DT and an OFF dead time DT by two.

The timing detector 11*b* detects a voltage of the third primary winding P3 of the transformer T2, to find an ON time of the switch element Q1. The dead time is determined by an exciting inductance Lp of a primary winding P1 of the transformer T2 and a voltage resonant capacitor C1 and is substantially constant.

The timer 14*b* stores an output from the timing detector 11*b*, subtracts half the constant dead time DT from the output, and copies the difference that indicates the ON time of the switch element Q1.

In this way, the DC-DC converter according to the second embodiment provides an effect similar to that provided by the DC-DC converter of the first embodiment.

Third Embodiment

Figure 7:
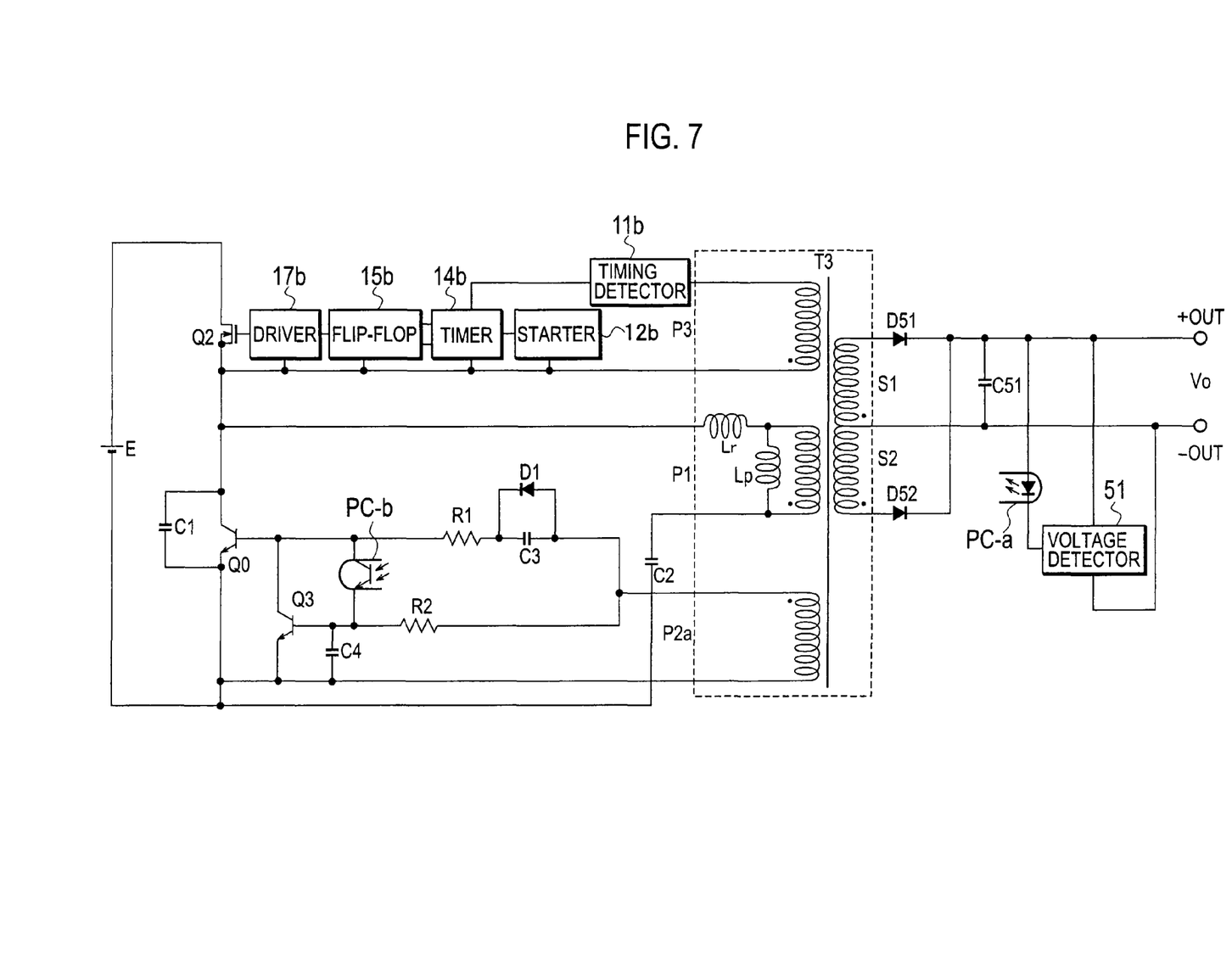
FIG. 7 is a view illustrating a DC-DC converter according to a third embodiment of the present invention.

FIG. 7 is a view illustrating a DC-DC converter according to the third embodiment of the present invention. This DC-DC converter employs a self-oscillation controller as a low-side controller.

A transformer T3 has a winding P2*a* whose first end is connected to a first end of a parallel circuit including a diode D1 and a capacitor C3 and a first end of a resistor R2. A second end of the parallel circuit including the diode D1 and capacitor C3 is connected through a resistor R1 to a collector of a transistor PC-b of a photocoupler. A second end of the resistor R2 is connected to an emitter of the transistor PC-b of the photocoupler, a base of a transistor Q3, and a first end of a capacitor C4.

A collector of the transistor Q3 is connected to a base of a transistor Q0. The transistor Q0 functions as a switch element Q1. A negative pole of a DC power source E is connected to an emitter of the transistor Q0, an emitter of the transistor Q3, a second end of the capacitor C4, and a second end of the winding P2*a* of the transformer T3.

The remaining configuration of the third embodiment illustrated in FIG. 7 is the same as that of the second embodiment illustrated in FIG. 5, and therefore, the same parts are represented with the same reference marks to omit the explanation thereof.

Operation of the DC-DC converter according to the third embodiment configured as mentioned above will be explained.

A starter 12*b* turns on a high-side switch element Q2, to start operation. When the switch element Q2 turns on, a voltage from the DC power source E is applied to a primary winding P1 of the transformer T3 and a current resonant capacitor C2. The voltage applied to the primary winding P1 causes the winding P2*a* of the transformer T3 to generate a voltage in proportion to a turn ratio.

The voltage generated by the winding P2*a* is in a direction to turn off the transistor Q0 and passes a current through a path extending along P2*a*, C3//D1, R1, Q0, and P2*a*. As a result, a base-emitter section of the transistor Q0 is reversely biased to maintain the OFF state of the transistor Q0.

When the switch element Q2 is turned off, voltages on the windings of the transformer T3 are inverted. Namely, the winding P2*a* generates a voltage in a direction to turn on the transistor Q0.

When the transistor Q0 turns on, a voltage accumulated in the capacitor C2 is applied to the primary winding P1 to cause the winding P2*a* to generate a voltage in proportion to the turn ratio. This maintains the ON state of the transistor Q0. A longest ON time of the transistor Q0 is determined by a time constant estimated by the capacitor C4 and resistor R2. When the voltage of the capacitor C4 reaches a base-emitter voltage Vbe of the transistor Q3, the transistor Q0 turns off.

A feedback value based on an output voltage provided through photocoupler elements PC-a and PC-b is used to control a charging current of the capacitor C4, so that the ON time of the transistor Q0 may be shortened.

When the transistor Q0 turns off, voltages on the windings of the transformer T3 are inverted and the voltage of the winding P2a maintains the OFF state of the transistor Q0. The voltage of the winding P3 operates a timing detector 11b, to turn on the switch element Q2. The remaining operation of the DC-DC converter illustrated in FIG. 7 is the same as that of the DC-DC converter illustrated in FIG. 3.

The present invention is not limited to the DC-DC converters of the first to third embodiments. For example, the configuration of the second embodiment illustrated in FIG. 5 may have first and second differential circuits. The first differential circuit is arranged between the winding P3 and the timing detector 11b and includes a resistor Ra and a capacitor Ca. The second differential circuit is arranged between the winding P2 and the timing detector 11a and includes a resistor Rb and a capacitor Cb.

In this case, the timing detector 11b detects through the first differential circuit a voltage change and polarity of the winding P3 of the transformer T2, and if the voltage change is equal to or greater than a fourth threshold, determines that the switch element Q2 has turned off. The timing detector 11a detects through the second differential circuit a voltage change and polarity of the winding P2 of the transformer T2, and if the voltage change is equal to or greater than a third threshold, determines that the switch element Q1 has turned off.

In this way, the voltage change and polarity of a winding of a transformer are usable to detect a transition period in which a switch element changes its state from ON (OFF) to OFF (ON) and the detected transition period is usable to generate a detection signal from a corresponding one of the first and second timing detectors.

Effects of the present invention will be summarized.

According to the first aspect of the present invention, the ON time storing part stores an ON time of the first switch element and the controller turns on the second switch element whose potential varies, only for the ON time stored in the ON time storing part. There is no need of using a level shifter or a pulse transformer when generating a drive signal for the second switch element. As a result, the first aspect causes no loss due to the level shifter or no size increase due to the pulse transformer. The DC-DC converter according to the first aspect, therefore, is compact, inexpensive, and operable at high frequencies without using expensive high-side drivers.

According to the second aspect of the present invention, the ON time storing part substantially equalizes the ON time of the first switch element and the ON time of the second switch element with each other. The DC-DC converter of the second aspect is applicable to, for example, a half-bridge converter in which a rectifier on the secondary side of a transformer conducts full-wave rectification.

According to the third aspect of the present invention, the first timing detector detects, if a terminal voltage of the first switch element reaches a first threshold, that the second switch element has turned off, and the second timing detector detects, if a terminal voltage of the second switch element reaches a second threshold, that the first switch element has turned off. Even if any one of the switch elements causes a potential change, a turn-off event of this switch is detectable according to a potential of the other switch element.

According to the fourth aspect of the present invention, a terminal voltage of each of the first and second switch elements is detected substantially at zero volts. This aspect simplifies the first and second timing detectors. By turning on the first switch element or the second switch element in response to a detection signal, a zero-volt switching operation is easily achieved.

According to the fifth aspect of the present invention, the first timing detector detects, if a voltage of the second primary winding reaches a first threshold, that the second switch element has turned off, and the second timing detector detects, if a voltage of the third primary winding reaches a second threshold, that the first switch element has turned off. The fifth aspect can optionally set a floating voltage, and therefore, can easily detect a turn-off event of each switch element.

According to the sixth aspect of the present invention, the first and second timing detectors detect voltages of the second and third primary windings of the transformer substantially at zero volts. This is the simplest way of detecting voltages.

According to the seventh aspect of the present invention, the voltage change and polarity of a winding of the transformer are detected to find a transition period in which the corresponding switch element changes its state from ON to OFF, or from OFF to ON. The detected transition period is used by the corresponding timing detector to generate a detection signal.

According to the eighth aspect of the present invention, the ON time storing part finds a difference between a stored ON time and a period during which the first and second switch elements are both OFF and turns on the second switch element only for a period corresponding to the difference. The eighth aspect can substantially equalize the ON time of the second switch element with the ON time of the first switch element.

According to the ninth aspect of the present invention, the timing of turning on the first and second switch elements is delayed by a predetermined time. When detecting a winding voltage of the transformer at zero volts, the first timing detector, for example, outputs a signal before the terminal voltage of the second switch element sufficiently decreases. Even in such a case, the ninth aspect can turn on the first switch element after the terminal voltage of the second switch element sufficiently decreases.

This application claims benefit of priority under 35USC §119 to Japanese Patent Application No. 2007-127843, filed on May 14, 2007, the entire contents of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:
1. A DC-DC converter comprising:
a first series circuit including a first switch element and a second switch element and connected to ends of a DC power source;
a second series circuit including a primary winding of a transformer and a capacitor and connected in parallel with one of the first switch element and the second switch element;
a rectifying-smoothing circuit configured to rectify and smooth a voltage generated by a secondary winding of the transformer;

a controller configured to alternately turn on/off the first and second switch elements according to an output voltage from the rectifying-smoothing circuit;

a first timing detector configured to detect ON/OFF states of the first and second switch elements;

a second timing detector configured to detect ON/OFF states of the first and second switch elements; and an ON time storing part configured to operate in response to a detection signal from the second timing detector and store an ON time of the first switch element based on an OFF time of the second switch element, wherein the controller turns on the second switch element only for the ON time stored in the ON time storing part.

2. The DC-DC converter of claim 1, wherein
the ON time storing part is further configured to substantially equalize the ON time of the first switch element and the ON time of the second switch element with each other.

3. The DC-DC converter of claim 2, wherein:
the transformer includes a second primary winding and a third primary winding;
the first timing detector detects turning off of the second switch element as a voltage of the second primary winding reaches a first threshold; and
the second timing detector detects turning off of the first switch element when a voltage of the third primary winding reaches a second threshold.

4. The DC-DC converter of claim 2, wherein:
the transformer includes a second primary winding and a third primary winding;
the first timing detector detects a voltage change and polarity of the second primary winding, and as the voltage change of the second primary winding is out of a first threshold range, determines that the second switch element has turned off; and
the second timing detector detects a voltage change and polarity of the third primary winding, and as the voltage change of the third primary winding is out of a second threshold range, determines that the first switch element has turned off.

5. The DC-DC converter of claim 1, wherein:
the first timing detector detects turning off of the second switch element as a terminal voltage of the first switch element reaches a first threshold; and
the second timing detector detects turning off of the first switch element as a terminal voltage of the second switch element reaches a second threshold.

6. The DC-DC converter of claim 1, wherein:
the transformer includes a second primary winding and a third primary winding;
the first timing detector detects turning off of the second switch element as a voltage of the second primary winding reaches a first threshold; and
the second timing detector detects turning off of the first switch element when a voltage of the third primary winding reaches a second threshold.

7. The DC-DC converter of claim 1, wherein:
the transformer includes a second primary winding and a third primary winding;
the first timing detector detects a voltage change and polarity of the second primary winding, and as the voltage change of the second primary winding crosses a first threshold range, determines that the second switch element has turned off; and
the second timing detector detects a voltage change and polarity of the third primary winding, and as the voltage change of the third primary winding crosses a second threshold range, determines that the first switch element has turned off.

8. The DC-DC converter of claim 1, wherein
the ON time storing part turns on the second switch element only during an estimated period according to a difference between the stored ON time and a period during which the first and second switch elements are both OFF.

9. The DC-DC converter of claim 1, wherein
the controller delays the timing of turning on the first switch element and the timing of turning on the second switch element by a predetermined time.

10. A DC-DC converter comprising:
a first series circuit including a first switch element and a second switch element and connected to ends of a DC power source;
a second series circuit including a primary winding of a transformer and a capacitor and connected in parallel with one of the first switch element and the second switch element;
a rectifying-smoothing circuit configured to rectify and smooth a voltage generated by a secondary winding of the transformer;
a controller configured to alternately turn on/off the first switch element according to an output voltage from the rectifying-smoothing circuit;
a timing detector configured to detect ON/OFF states of the first and second switch elements; and
an ON time storing part configured to operate in response to a detection signal from the timing detector and store an ON time of the second switch element based on an OFF time of the first switch element, wherein
the controller turns on the second switch element only for the ON time stored in the ON time storing part such that the ON time of the second switch element coincides with an ON time of the first switch element.

* * * * *